UNITED STATES PATENT OFFICE.

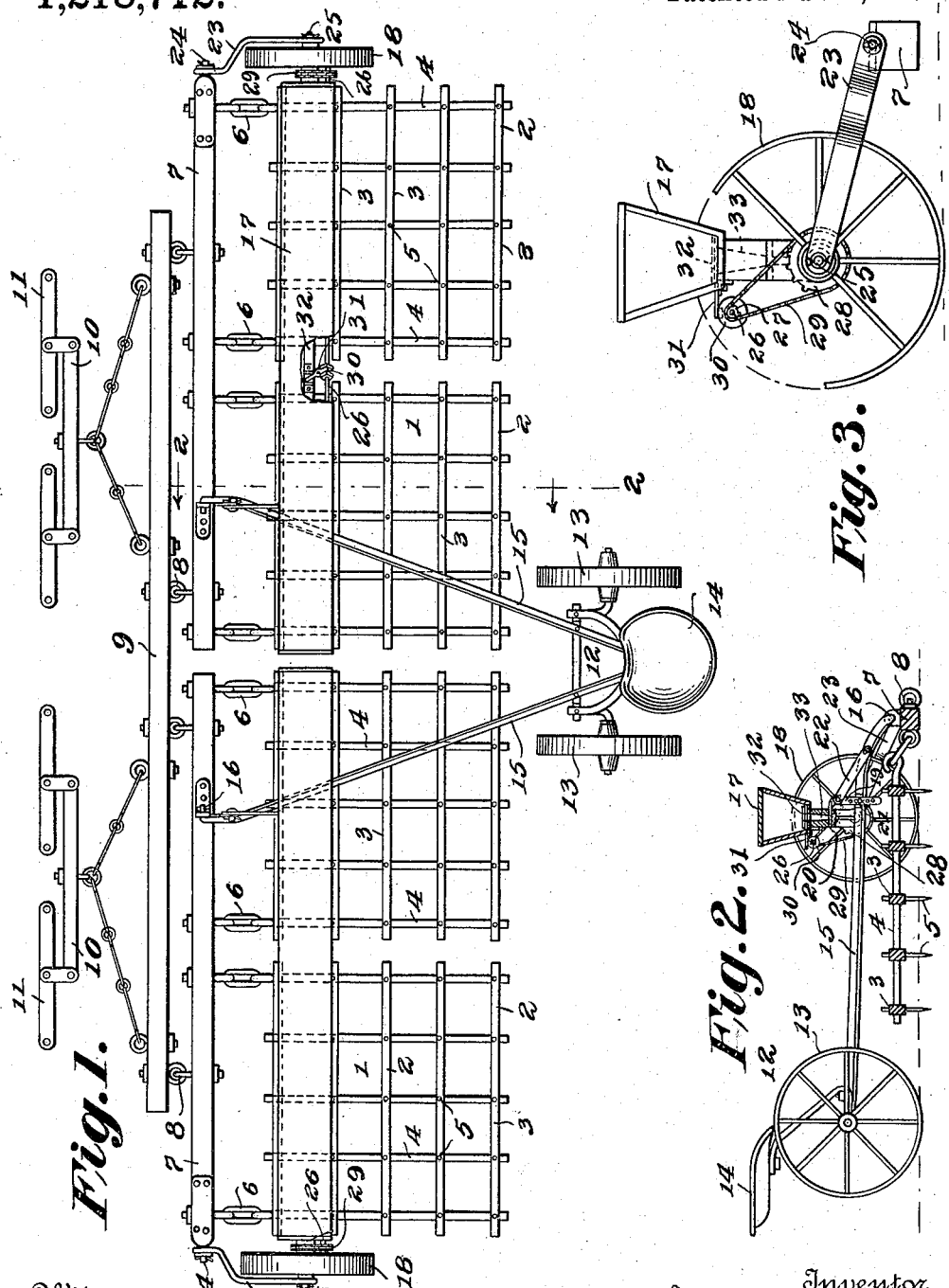

DEWEY D. STEPHENS, OF AINSWORTH, IOWA.

SEEDER AND HARROW.

1,218,712. Specification of Letters Patent. Patented Mar. 13, 1917.

Application filed March 19, 1915. Serial No. 15,508.

*To all whom it may concern:*

Be it known that I, DEWEY D. STEPHENS, a citizen of the United States, residing at Ainsworth, in the county of Washington and State of Iowa, have invented certain new and useful Improvements in Seeders and Harrows, of which the following is a specification, reference being had therein to the accompanying drawing.

The invention relates to a combined seeding and harrowing mechanism in the construction of which use can be made of a harrow of standard construction.

The objects of the invention, therefore, are to provide a combined mechanism of the class referred to and also to provide a feeding mechanism which is adapted to be combined with a harrow in the way described.

Of the drawings which illustrate one embodiment of the invention,

Figure 1 is a plan view;

Fig. 2 is a side view partly in section along the line 2—2 of Fig. 1;

Fig. 3 is an enlarged side view of the seeder part of the mechanism.

Referring to the drawings, 1 represents, as a whole, the harrow which is of the toothed class. As concerns the details of the harrow, it will be understood that there can be wide variation without departing from the spirit of the invention. But in order that one embodiment of the invention may be clearly understood I will describe the particular harrow which has been selected for purposes of illustration. The harrow is of the spike toothed variety, there being four tooth-carrying frames 2—2. Each frame is made up of transverse bars 3, 3, preferably of wood, and longitudinal bars 4, 4, preferably of metal and extending through suitable apertures in the wooden bars 3, 3. Vertical spikes 5 extend through the bars 3 and 4 and have their lower ends sharpened to engage the ground. The four frames 2—2 are arranged in pairs, and those of each pair are connected by means of suitable chain links 6, 6 with a transverse drag bar 7. The two drag bars 7, 7 are, in turn, connected by means of suitable links or eyes 8, 8 with a transverse drag bar 9. To the drag bar 9 are connected suitable double trees 10 and swingletrees 11 for the attachment of two pairs of horses.

A suitable truck 12, having two ground wheels 13, 13, carries a driver's seat 14. The truck 12 is connected with the forward parts of the harrow, preferably with the drag bars 7, 7, by means of forward extending diverging rods or bars 15, 15. These are connected with the drag bars 7, 7 by means of horizontal pivots at 16, 16.

The seeder part of the mechanism is detachable from the harrow part above described, and it will be understood that the harrow can be used independently of the seeder when desired. As concerns the details of construction, the seeder mechanism can be of any one of a number of forms, and the invention is not limited to the exact construction shown. The seeder mechanism is made in two sections which are similar to each other except that the driving and supporting parts are reversed. Each section comprises a longitudinally extending horizontal seed box 17 which is supported at its outer end on a rotatable ground wheel 18 and at its inner end on one of the aforesaid draft bars 15 for the seat truck. As concerns the connection at this inner end there can be variation, but for purposes of illustration I have shown an upright bar 19 having formed rigid therewith a horizontal portion 20 which is secured rigidly to the seed box. The upright 19 preferably has a number of apertures therein through any one of which can be inserted a pin 21 for connecting the upright with the draft rod 15. By this construction the inner end of the seed box can be raised or lowered as desired. A brace 22 extending forward to the draft rod 15 serves to hold the upright 19 against turning about the pin 21.

The outer end of each seeder mechanism is connected with the outer end of the corresponding drag bar 7 by means of a link 23. Each bar 7 carries at its outer end a pivot pin 24, with which the forward end of the corresponding link engages. Each stud axle on which the corresponding ground wheel 18 is mounted is provided with an extension 25 with which the rear end of the corresponding link engages.

As concerns the devices for measuring and discharging the seeds from the box at 7, there can be wide variation. For purposes of illustration I have shown a transverse rotatable shaft 26, driven from the corresponding ground wheel 18 by means of sprocket wheels 27 and 28 and a chain 29. By means of a cam 30 and a rocking lever 31, an apertured feed plate 32 extending longitudinally of the seed box is reciprocated. The bottom of the box is provided with apertures with which the apertures in the bar 32 can register. When registration takes place during reciprocation the seeds flow out and are discharged to the ground through seed tubes such as are indicated at 33 in Fig. 3.

From the foregoing description it will be seen that I have provided a seeder mechanism which is so connected to and correlated with the harrowing mechanism that both can be operated simultaneously. The parts are so arranged that the front row of harrow teeth first breaks and loosens the soil. After the front row of teeth has passed over the ground the seed is deposited on top of it from the seeder mechanism. Then the rear rows of harrow teeth engage the soil and further break it up and loosen it, at the same time raking the seed into it.

The connections of the inner ends of the seeder mechanisms to the draft bars 15, 15 are sufficiently loose to permit relative rising and falling movements of the outer ends as the wheels 18, 18 follow the ground surface. The connection of the outer ends of the seeder sections to the harrow through the links 23, 23 permits relative independence of movement vertically, thus insuring the full weight of the outer parts of the seeder sections on the wheels to give sufficient draft force to turn the wheels and operate the mechanical parts of the seeder.

By making use of the truck 12 and its draft bars 15, 15 I am enabled to eliminate any supplemental supports for the inner ends of the seeder sections, thus greatly simplifying the construction. The whole mechanism is flexible so that irregularities of the ground can be followed closely, the harrow being formed in four sections each independently movable vertically and the seeder being formed in two sections each independently movable vertically. The truck 12 and the draft bars 15 not only serve to support and hold the driver, but also serve to support the inner ends of the seeder mechanisms and to carry them at a uniform distance from the ground even though the ground surface may be irregular and uneven.

What I claim is:

1. The combination of a toothed harrow, a driver's truck, a seeder mechanism extending transversely of the harrow from one side to the other between the front and rear edges thereof, the seeder mechanism being constructed in two sections each supported at its inner end in part on the driver's truck and each having at its outer end a ground-engaging supporting and driving wheel, and draft connections for the said harrow and the outer ends of the said seeder mechanism sections permitting each to freely follow the ground surface independently of the other.

2. The combination of a toothed harrow, a driver's truck connected with the harrow to be drawn thereby, and a seeder mechanism extending transversely of the harrow from one side to the other between the front and rear edges thereof, the seeder mechanism being constructed in two sections each supported at its inner end in part on the said driver's truck and each having at its outer end a ground-engaging supporting and driving wheel.

3. The combination of a toothed harrow, a driver's truck connected with the harrow to be drawn thereby, a seeder mechanism extending transversely of the harrow from one side to the other between the front and rear edges thereof, the seeder mechanism being constructed in two sections each supported at its inner end in part on the said driver's truck and each having at its outer end a ground-engaging supporting and driving wheel, and draft connections for the said harrow and the outer ends of the said seeder mechanism sections permitting each to freely follow the ground surface independently of the other.

4. The combination of a toothed harrow, a driver's truck having ground wheels behind the harrow and draft bars extending forward to the harrow, and a seeder mechanism extending transversely of the harrow from one side to the other between the front and rear edges thereof, the seeder mechanism being constructed in two sections each supported at its inner end on one of the draft bars for the said truck and each having at its outer end a ground engaging supporting and driving wheel.

5. The combination of a toothed harrow, a driver's truck having ground wheels behind the harrow and draft bars extending forward to the harrow, a seeder mechanism extending transversely of the harrow from one side to the other between the front and rear edges thereof, the seeder mechanism being constructed in two sections each supported at its inner end on one of the draft bars for the said truck and each having at its outer end a ground-engaging supporting and driving wheel, and draft connections for the said harrow and the outer ends of the said seeder mechanism sections permitting each to freely follow the ground surface independently of the other.

6. The combination of a toothed harrow, a driver's truck and a seeder mechanism extending transversely of the harrow from one side to the other between the front and rear edges thereof, the seeder mechanism being constructed in two sections each vertically adjustably supported at its inner end in part on the driver's truck and each having at its outer end a ground-engaging supporting and driving wheel.

7. The combination of a toothed harrow, a driver's truck, a seeder mechanism extending transversely of the harrow from one side to the other between the front and rear edges thereof, the seeder mechanism being constructed in two sections each vertically adjustably supported at its inner end in part on the driver's truck and each having at its outer end a ground-engaging supporting and driving wheel, and draft connections for the said harrow and the outer ends of the said seeder mechanism sections permitting each to freely follow the ground surface independently of the other.

8. The combination of a toothed harrow, a driver's truck having ground wheels behind the harrow and draft bars extending forward to the harrow, and a seeder mechanism extending transversely of the harrow from one side to the other between the front and rear edges thereof, the seeder mechanism being constructed in two sections each vertically adjustably supported at its inner end on one of the draft bars for the said truck and each having at its outer end a ground-engaging supporting and driving wheel.

9. The combination of a toothed harrow, a driver's truck having ground wheels behind the harrow and draft bars extending forward to the harrow, a seeder mechanism extending transversely of the harrow from one side to the other between the front and rear edges thereof, the seeder mechanism being constructed in two sections each vertically adjustably supported at its inner end on one of the draft bars for the said truck and each having at its outer end a ground-engaging supporting and driving wheel, and draft connections for the said harrow and the outer ends of the said seeder mechanism sections permitting each to freely follow the ground surface independently of the other.

In testimony whereof, I affix my signature, in presence of two witnesses.

DEWEY D. STEPHENS.

Witnesses:
  R. L. STEPHENS,
  SAMUEL A. STEPHENS.

Copies of this patent may be obtained for five cents each, by addressing the "Commissioner of Patents, Washington, D. C."